J. Mumma,
Water Wheel,
№ 69,360.                    Patented Oct. 1, 1867.
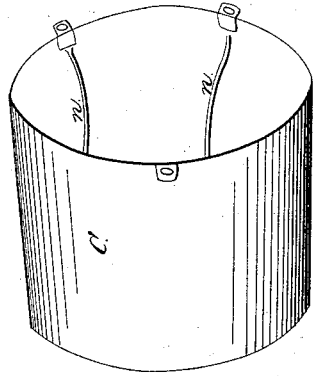
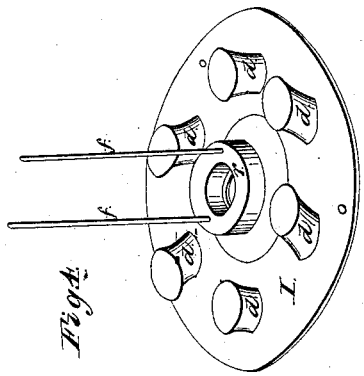
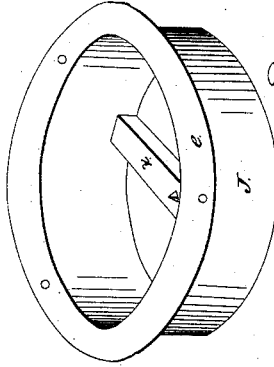
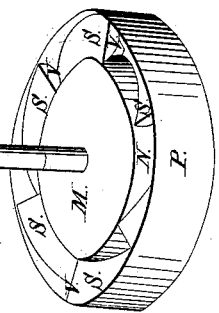
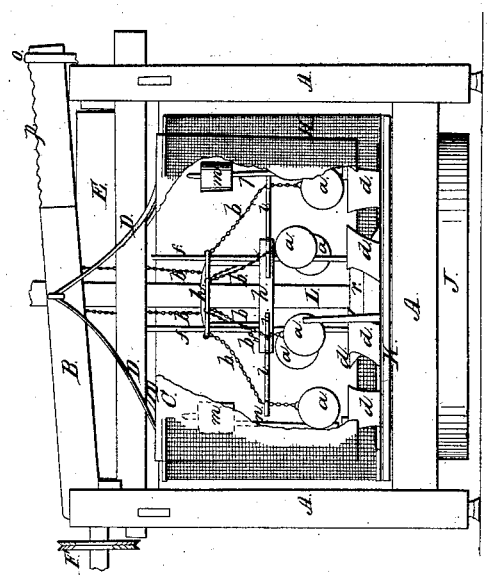
Witnesses.                                    Inventor.
                                              John Mumma.

United States Patent Office.

JOHN MUMMA, OF MIDDLETOWN, OHIO.

Letters Patent No. 69,360, dated October 1, 1867; antedated September 23, 1867.

IMPROVEMENT IN WATER-WHEELS.

*The Schedule referred to in these Letters Patent and making part of the same.*

TO ALL WHOM IT MAY CONCERN:

Be it known that I, JOHN MUMMA, of Middletown, in the county of Butler, in the State of Ohio, have invented new and useful Improvements in Water-Wheels; and I do hereby declare that the following is a full and exact description thereof, reference being had to the accompanying drawings, and to the letters of reference marked thereon.

Figure 1 represents my improved water-wheel with its chutes, gates, and operating mechanism as arranged in the forebay of a mill.

Figure 2 represents the curb in which the wheel with its shaft-step is placed.

Figure 3 represents the wheel and shaft.

Figure 4 represents the plate or disk to which the chutes are connected; and

Figure 5 represents a cylindrical floating gate.

My invention consists in the use of tubular or funnel-shaped chutes and concave buckets, with a system of gates and connecting mechanism, whereby the water is regulated in quantity, and directed upon the buckets, which are inclined at a slight angle to a vertical line, the jet passing through the chutes, being concentrated with its entire power upon the inclined buckets, as will be herein more fully described.

In the accompanying drawings, A indicates the frame of a forebay. B is a forked lever to which the floating-gate C is connected by the rods D D. E is a roller extending across the forebay, and projecting over its side. At the projecting end of this roller there is a pulley, F, by means of which the system of ball-gates $a\ a\ a$ are raised and lowered through the connecting chains $b\ b\ b$. H is a rack or screen of wire cloth, surrounding the gates and chutes $d\ d$, to prevent obstructions from passing into the chutes. The curb J is placed with its flange $e$ upon the annular diaphragm in the forebay; the diaphragm K being provided with a circular opening of a size corresponding with the circumference of the curb J. X is the bridge-tree across the curb, in which the wheel-shaft is stepped. The chute-plate or disk I, which is also placed upon the diaphragm K over the curb-flange $e$, is provided with a series of inclined funnel-mouthed tubular chutes, $d\ d$. The guide-rods $ff$ are secured to the disk I, and pass through the loose hub $r$, through which the wheel-shaft L passes. Two rings $h\ h$ surround the wheel-shaft, and to the upper ring $h$ two of the chains $b\ b$ are attached. These chains are connected to the roller E. The other chains $b\ b$ to which the ball-gates are attached are connected with the arms $i\ i$ radiating from the lower ring $h$. The guide-rods $ff$ which pass through the hub or loose ring $r$, extend through holes in the two rings $h\ h$, and serve the purpose of guiding the suspended ball-gates $a\ a$ in their descent upon their respective chutes. $m\ m$ are floats of cork, upon rods $n\ n$, the latter being attached to the cylindrical gate C, for the purpose of regulating its elevation for the entrance of water beneath it. The floating gate C is only necessary when it is desired to regulate the flow of water to the wheel by a governor. $o$ is a weight resting upon the end of the forked lever B, and as this lever is hinged at one end to the forebay, and is rigidly connected to the floating gate C by the rods D D, the weight which may be adjusted in the notches $p$ will serve to cause the gate C to stand at any desired elevation for the admission of the water. The hub or ring $r$ is fitted close around the shaft L, but will not create friction by the revolutions of the shaft within it. By means of this ring $r$ a leather packing or washer is held in contact with the shaft L, and upon the disk I. The object of this construction is to prevent waste of water around the shaft, and at the same time avoid friction. M is the hub of the water-wheel, of which N is the periphery. Between the periphery N of the hub, and the outer ring P, the buckets S are secured. These buckets approximate a semi-oval form, and are curved laterally to fit the periphery of the hub M. They are also formed in the arc of a circle longitudinally as well as transversely. The buckets S stand at an inclination of about thirty degrees to a horizontal line. The upper ends of the buckets are made with an abrupt curve forming a hood or cap, V. The object of this form of bucket is to concentrate the jet of water introduced through the inclined funnel-mouthed chutes $d$, and prevent it from lateral action upon the adjacent parts of the wheel, and at the same time facilitate its discharge as soon as its direct action and power for propelling the wheel are exhausted. The buckets are arranged round the hub M of the wheel so as to overlap each other, as represented in the drawings, and the concave faces of the buckets receive the jets of water from the chutes at such an angle as to most effectually propel the wheel's revolutions. It will be readily understood that the water, in passing through the chutes inclined slightly from a vertical line, will act with greater power upon the buckets, than when directed thereon in a horizontal line, and the benefit is also obvious that results from the gravitating action of the water upon buckets standing at an acute angle to the horizon, because in this case the water is wholly freed from the wheel as soon as it leaves the bucket. These are advantages which cannot result in the use of wheels with vertical buckets and central discharge. By the use of my tubular chutes, the water used to propel a wheel may be readily and correctly gauged without loss of head, as is the case generally. It will be observed that all the water must pass through the wheel and out through the curb J without any waste, which is unavoidable where the wheel with its case is submerged in a forebay. In using my wheel, the cylindrical gate C will be properly adjusted by means of the hinged lever B, weight o, and floats m, to admit the desired quantity of water, and by the rigid suspending rods D D this gate may be submerged to any extent necessary. The water will flow through the screen-guard H and fill the space over the disk I, and by revolving the shaft or roller E, the spider, consisting of the rings h h and rods i, will be elevated by the chains b, causing the ball-gates a to be raised from their seats on the mouths of the chutes d for the passage of the water upon the buckets S, which will propel the wheel. The ball-gates are suspended at different heights, so as to graduate the water to be used as may be desired.

Having fully described my improvements in water-wheels, what I claim and desire to secure by Letters Patent as my invention, is—

1. The elongated concave buckets S, terminating at their upper ends with the cap V, constructed, arranged, and operating in the manner and for the purpose described.

2. The floating cylindrical gate C, in combination with floats m, lever B, and rods D, arranged and operating substantially as described.

3. The cylindrical rack or screen H, in combination with chutes d and gate C, arranged as described for the purpose specified.

4. The combination of the ball-gates a with chutes d, operating substantially as specified for the purpose set forth.

5. The rings h h, arms i, chains b, guide-rods f, and roller E, arranged in relation to the ball-gates a, all substantially as and for the purpose specified.

6. The chute-disk I with its packing-ring r, in combination with chutes d and annular diaphragm K arranged above the wheel and its curb J, all constructed and operating substantially as and for the purposes described.

In testimony whereof I have hereunto set my hand.

JOHN MUMMA.

Witnesses:
H. P. K. PECK,
A. L. PECK.